United States Patent [19]

Dodgen

[11] Patent Number: 4,914,857
[45] Date of Patent: Apr. 10, 1990

[54] TOMATO VINE SUPPORTING DEVICE

[75] Inventor: John N. Dodgen, Fort Dodge, Iowa

[73] Assignee: Dodgen Industries, Inc., Humboldt, Iowa

[21] Appl. No.: 294,775

[22] Filed: Jan. 9, 1989

[51] Int. Cl.$^4$ ............................................. A01G 17/06
[52] U.S. Cl. ........................................ 47/47; 248/156; 248/175
[58] Field of Search ...................... 248/27.8, 153, 156, 248/175, 302, 213.2; 47/47

[56]  References Cited
U.S. PATENT DOCUMENTS

| 597,841 | 1/1898 | Dolf | 47/47 |
|---|---|---|---|
| 760,879 | 5/1904 | Kunzman | 2148/175 |
| 897,006 | 8/1908 | Muller | 47/47 |
| 915,146 | 3/1909 | Woerner | 47/47 |
| 1,617,494 | 2/1927 | Nuckols | 248/156 |
| 1,843,366 | 2/1932 | Kreimer | 248/27.8 |
| 1,942,750 | 1/1934 | Eue | 47/47 |
| 2,406,439 | 8/1946 | Pratt | 47/47 |
| 3,026,649 | 3/1962 | Barakauskas | 47/47 |
| 3,076,289 | 2/1963 | Gallo | 47/47 |
| 3,627,242 | 12/1971 | Vandermast | 248/153 |

FOREIGN PATENT DOCUMENTS

| 512601 | 11/1930 | Fed. Rep. of Germany | 47/47 |
|---|---|---|---|
| 589238 | 11/1933 | Fed. Rep. of Germany | 47/47 |
| 253227 | 6/1926 | United Kingdom | 47/47 |
| 449978 | 7/1936 | United Kingdom | 47/47 |
| 664433 | of 1949 | United Kingdom | 47/47 |
| 1272942 | 5/1972 | United Kingdom | 47/47 |

Primary Examiner—Ramon O. Ramirez
Assistant Examiner—Robert A. Olson
Attorney, Agent, or Firm—Zarley, McKee, Thomte, Voorhees & Sease

[57]  ABSTRACT

A tomato vine supporting device having a plurality of spaced vertically elongated rods equally spaced in a circular configuration. The upper ends of the rods terminate in an outwardly and downwardly extending arm with the outer ends of the arms terminating in upwardly extending hook elements. A first circular horizontal ring is removably nested in these hook elements. Second hook elements are mounted on the upper ends of the rods, and third hook elements are secured to the rods intermediate their upper and lower ends. Second and third rings are removably nested in the second and third elements, respectively. The lower ends of the rods can be inserted into the ground, mounted in sockets within an earth container, or otherwise secured to the rim of an earth container.

9 Claims, 3 Drawing Sheets

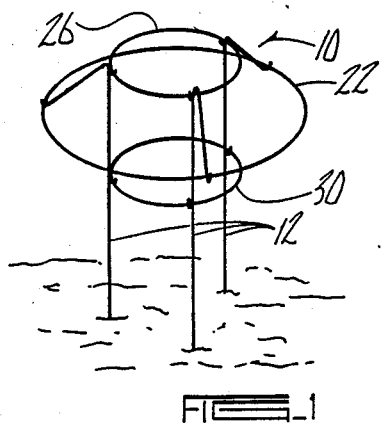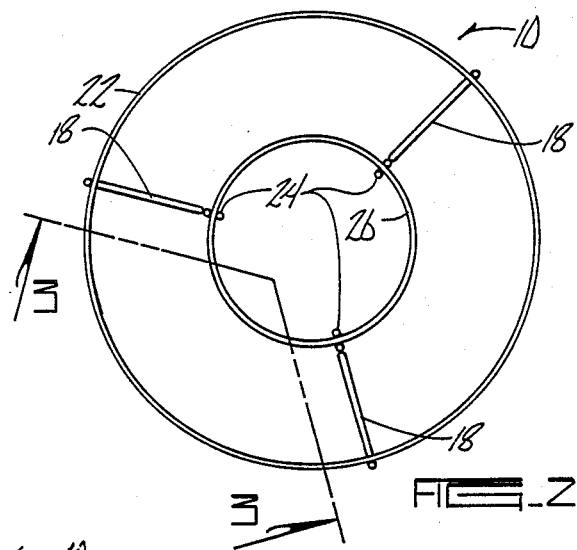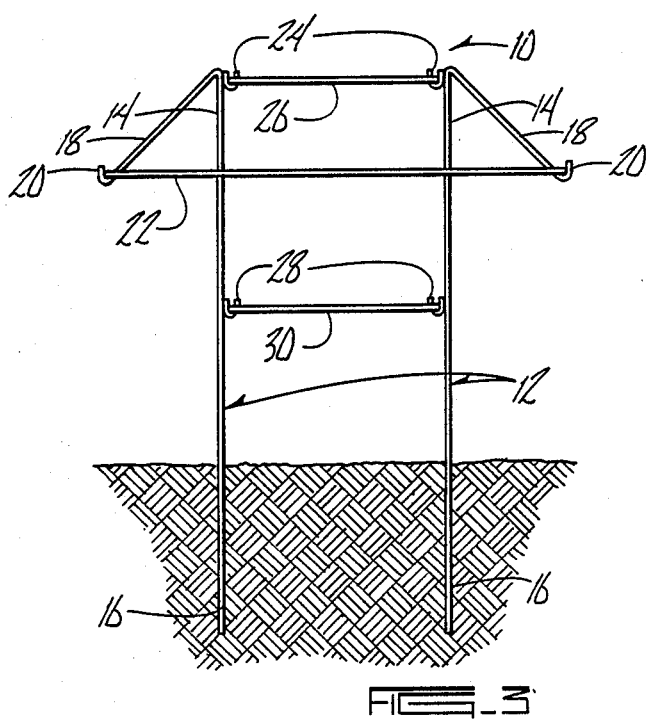

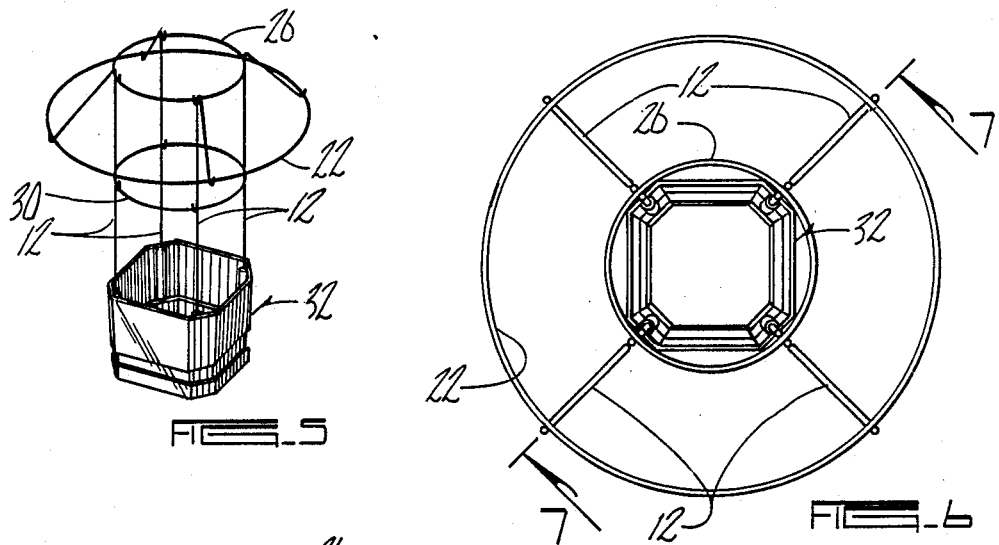
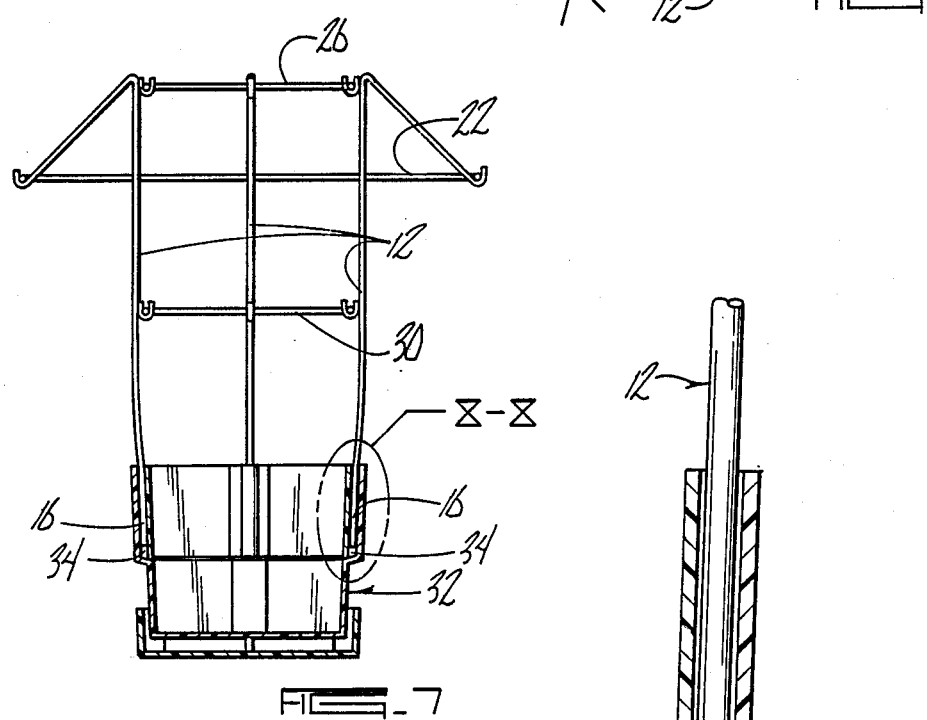
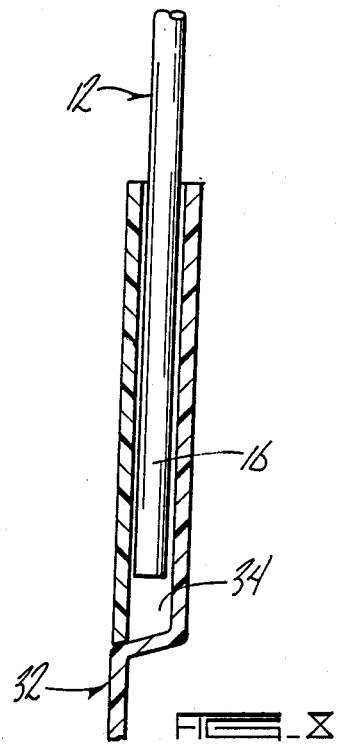

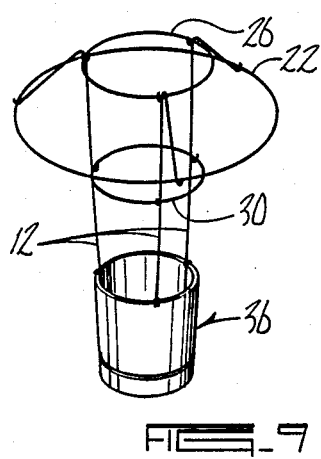
FIG_7
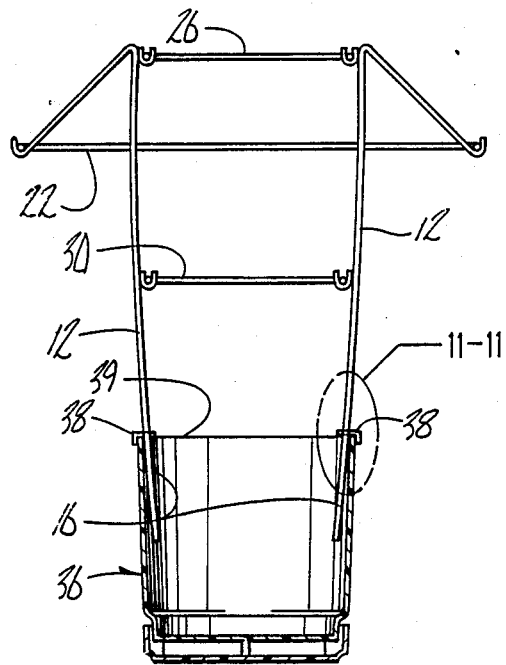
FIG_10
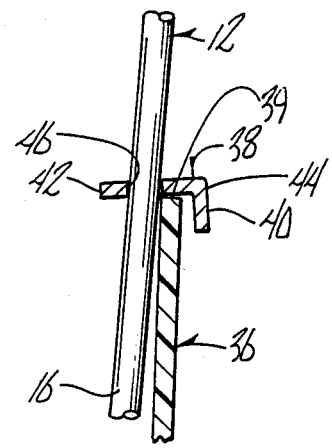
FIG_11
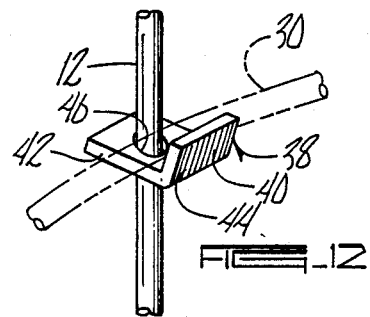
FIG_12

4,914,857

TOMATO VINE SUPPORTING DEVICE

BACKGROUND OF THE INVENTION

Tomato vine support devices have existed in the prior art and serve the purpose of supporting the vine and the branches thereof during maturity to hold both the branches and the tomatoes off of the ground surface. These devices enhance the productivity of the tomato vine and facilitate the harvesting of the tomatoes. In addition, vines supported by such structures are more easily cultivated and watered.

However, existing tomato vine support devices comprising a plurality of upstanding legs interconnected by a plurality of concentric rings are expensive to fabricate and difficult to ship in that they are generally rigid unitary structures with the legs being permanently interconnected with the rings. Further, the height of the rings with respect to the legs cannot be adjusted by virtue of the rigid connection between the rings and the legs.

It is, therefore, a principal object of this invention to provide a tomato vine support device which is completely collapsible by reason of the rings being removably secured to the upstanding legs.

A further object of this invention is to provide a plurality of hook elements secured to the legs for supporting the concentric rings.

A still further object of this invention is to provide a tomato vine support device that is economical of manufacture.

An additional object of this invention is to provide a tomato vine support device wherein at least some of the concentric rings can have their positions vertically adjusted.

These and other objects will be apparent to those skilled in the art.

SUMMARY OF THE INVENTION

This invention comprises a vine support device comprising a plurality of spaced vertically elongated rods equally spaced in a circular configuration. The upper ends of the rods terminate in an outwardly and downwardly extending arm with the outer ends of the arms terminating in upwardly extending hook elements. A first circular horizontal ring is removably nested in these hook elements.

Second hook elements are mounted on the upper ends of the rods, and third hook elements are secured to the rods intermediate their upper and lower ends. Second and third rings are removably nested in the second and third elements, respectively.

The lower ends of the rods can be inserted into the ground, mounted in sockets within an earth container, or otherwise secured to the rim of an earth container.

BRIEF DESCRIPTION OF THE DRAWINGS

FIG. 1 is a perspective view of a tomato vine support device of this invention;

FIG. 2 is a top plan view of the device of FIG. 1 shown at an enlarged scale;

FIG. 3 is an elevational view of the device of FIG. 2 taken on line 3—3 of FIG. 2;

FIG. 4 is an enlarged-scale perspective view of the engagement of the lower ring element with a hook element on one of the vertically extending rods;

FIG. 5 is a perspective view similar to FIG. 1 but shows the device of FIG. 1 mounted in the vertical sockets of an earth container;

FIG. 6 is a plan view shown at an enlarged scale of the device of FIG. 5;

FIG. 7 is a sectional view of the device of FIG. 5 taken on line 7—7 of FIG. 6;

FIG. 8 is an enlarged-scale sectional view showing the detailed structure of FIG. 7 denominated by the section lines 8—8;

FIG. 9 is a perspective view of a tomato vine supporting device similar to that of FIG. 1 wherein the device of FIG. 1 is supported on the rim of a circular container;

FIG. 10 is an enlarged-scale sectional view of the device of FIG. 9;

FIG. 11 is an enlarged-scale detail of the hook element shown by the section lines 11—11 in FIG. 10;

FIG. 12 is a partial perspective view of the clip element of FIG. 11 mounted at an intermediate position on a vertically extending rod in lieu of the hook elements shown in FIGS. 1-10.

DESCRIPTION OF THE PREFERRED EMBODIMENT

The numeral 10 designates a tomato vine supporting device having a plurality of vertically extending rods 12 having upper ends 14 and lower ends 16. At least three vertical rods should be utilized, but four or more rods can be utilized, as illustrated in FIG. 5.

The upper ends 14 of rods 12 terminate in outwardly and downwardly extending arms 18. The lower ends of the arms 18 terminate in first hook elements 20. The hook elements 20 extend in an upwardly direction and releasably support and receive the first horizontally disposed circular ring 22. The ring 22 stabilizes the rods 12 and maintains the arms 18 in a radially extending position. The rods 12 are preferably always arranged in a circular pattern.

Second hook elements 24 are secured by welding or the like to the upper ends 14 of vertical rods 12. These hook elements 24 releasably receive and support the second circular ring 26. Ring 26 stabilizes the relative positions of the upper ends of the rods 12.

Similarly, third hook elements 28 are welded or otherwise secured to the substantial midpoints of rods 12. A third circular ring 30 is releasably mounted within the hook elements 28 as best shown in FIG. 4.

A device of this invention can be mounted on an earth container as generally shown in FIGS. 5 and 9. In FIG. 5, the lower ends 16 of rods 12 are supported by a substantially rectangular earth container 32. This is accomplished by having the lower ends 16 of rods 12 extend into a plurality of vertically disposed sockets 34 in container 32. The detailed relationship between the lower ends of the rods and sockets 34 is best shown in FIG. 8.

FIG. 9 discloses a substantially round earth container 36 which supports the vine support device 10 of FIG. 1. The supporting relationship of container 36 is accomplished by fourth hook elements 38 which engage the upper rim and are comprised of a bracket 40 which has a horizontal portion 42 and a vertical or upstanding portion 44. Horizontal portion 42 has an enlarged aperture 46 which receives one of the rods 12. The aperture 46 has a diameter greater than the diameter of the rods 12 so that when the bracket 40 is in a tilted position with respect to the rod, as best shown in FIG. 11, the aperture 46 will bind on the rod, and the rod will not slide through the aperture. By tilting the bracket 40 to a horizontal position, the rod is easily removed from the aperture 46. This would be done when it is desired to remove the device 10 from the rim of container 36.

If it is desired to make either of the rings 26 or 30 height-adjustable, the brackets 40 may be substituted for the second and third hook elements 24 and 28. Such an arrangement is illustrated in FIG. 12.

It is seen that the vine support device described above can be completely disassembled by removing the rings 22, 26 and 30 from their respective hook elements. Each rod 12 is then completely independent of the structure, and the rods can be easily packaged for shipment or storage.

By utilizing the brackets 40 to support the rings 26 and 30, the vertical position of these rings can be selectively adjusted to accommodate the size of the tomato vine being supported.

The containers shown in FIGS. 5 and 9 are commercially available and do not comprise of themselves a part of this invention.

Thus, from the foregoing, it is seen that this invention will accomplish as least its stated objectives.

I claim:

1. A vine support device, comprising,
   a plurality of spaced vertical elongated rods equally spaced in a circular configuration, with each of said rods having upper ends terminating in outwardly and downwardly extending arms with outer ends terminating in upwardly extending first hook elements,
   a first circular horizontal ring removably nested in said first hook elements,
   second hook elements extending inwardly from the upper ends of said rods,
   third hook elements extending inwardly from said rods intermediate the upper and lower ends of said rods,
   and second and third rings removably nested in said second and third hook elements, respectively.

2. The device of claim 1 wherein said third hook elements are vertically adjustably secured to said rods.

3. The device of claim 1 wherein said second and third hook elements are vertically adjustably secured to said rods.

4. The device of claim 1 wherein said first, second, and third rings are in tight engaging relationship with said first, second and third hook elements, respectively, to stabilize the vertical position of said rods.

5. The device of claim 1 wherein said third hook elements are comprised of an L-shaped bracket comprised of a horizontal portion and an upstanding portion, an aperture in said horizontal portion slidably receiving the rod upon which said bracket is mounted, said aperture being slightly larger than the diameter of said rods so that the weight and presence of said third ring between said rods and the upstanding portion of said brackets will bind said brackets on said rods to hold said brackets against sliding motion on said rods.

6. The device of claim 7 wherein said second hook elements are identical to said third hook elements.

7. The device of claim 1 wherein said lower ends of said rods are secured to a container.

8. The device of claim 7 wherein said lower ends of said rods are received within vertically disposed sockets within said container.

9. The device of claim 7 wherein said container has an upper perimeter edge, and fourth hook elements interconnect said rods to said upper perimeter edge of said container.

* * * * *